United States Patent [19]

Saluti

[11] 3,846,509

[45] Nov. 5, 1974

[54] ACRYLONITRILE-ACRYLATE COPOLYMERS REINFORCED WITH GRAFTED BUTADIENE RUBBER

[75] Inventor: Gerald Michael Saluti, Norwalk, Conn.

[73] Assignee: American Cyanamid Company, Stamford, Conn.

[22] Filed: Oct. 27, 1971

[21] Appl. No.: 193,189

[52] U.S. Cl. ........ 260/876 R, 260/85.5 ES, 260/879
[51] Int. Cl. ............................................. C08f 15/38
[58] Field of Search ........... 260/876 R, 879, 85.5 R, 260/85.5 ES

[56] References Cited
UNITED STATES PATENTS

| | | | |
|---|---|---|---|
| 2,117,321 | 5/1938 | Hill | 260/85.5 ES |
| 2,123,599 | 7/1938 | Fikentscher et al. | 260/85.5 ES |
| 3,449,471 | 6/1969 | Weitzel et al. | 260/876 R |

Primary Examiner—Murray Tillman
Assistant Examiner—J. Ziegler
Attorney, Agent, or Firm—Frank M. Van Riet

[57] ABSTRACT

Compositions of matter comprising from about 5 to about 30 percent, by weight, of polybutadiene grafted with acrylonitrile and an alkyl acrylate, said alkyl group having from 2-4 carbon atoms, inclusive, and from about 70 to about 95 percent, by weight, of a copolymer of acrylonitrile and a lower alkyl acrylate or methacrylate, said alkyl group having from 1-3 carbon atoms, inclusive, the number of carbon atoms in the alkyl group of the grafted acrylate being more than the number of carbon atoms in the alkyl group of the copolymerized acrylate or methacrylate and a process for the production thereof, are disclosed.

10 Claims, No Drawings

3,846,509

ACRYLONITRILE-ACRYLATE COPOLYMERS REINFORCED WITH GRAFTED BUTADIENE RUBBER

BACKGROUND OF THE INVENTION

In copending application Ser. No. 193,190, filed of even date herewith, of which I am a coinventor with Joseph Francis Terenzi, which application is hereby incorporated herein by reference, there is described a novel class of compositions comprising a polybutadiene rubber grafted with acrylonitrile and a lower alkyl acrylate or methacrylate and a copolymer of acrylonitrile and the same alkyl acrylate or methacrylate in the grafted rubber.

The compositions of said application possess excellent barrier properties as regards vapor transmission and oxygen and $CO_2$ permeability and also exhibit good impact strength and are therefore indicated as useful for packaging applications.

SUMMARY

I have now discovered that the barrier properties and impact strength of compositions similar to those of my copending application can be even more greatly enhanced if the alkyl acrylate which is grafted onto the polybutadiene possesses a greater number of carbon atoms in the alkyl group thereof than the number of carbon atoms present in the alkyl portion of the alkyl acrylate or alkyl methacrylate component of the acrylonitrile copolymer.

Furthermore, such compositions possess excellent light transmission properties due to the fact that the refractive indices of the grafted rubber and copolymer phases can be more closely matched than previously experienced.

My novel compositions may be especially utilized in the packaging industry for a multiplicity of applications. Since certain monomers impart certain desired properties to the compositions when in the resin phase, e.g., high heat distortion, high modulus etc., good creep, and the monomers in the grafted rubber phase provide the general impact properties mentioned above, the combination results in the wide diversion of properties which are required for an overall spectrum of products.

DESCRIPTION OF THE INVENTION INCLUDING PREFERRED EMBODIMENTS

The novel compositions of the instant invention can be prepared by either of two procedures. The first procedure comprises grafting the polybutadiene rubber with the acrylonitrile and an alkyl acrylate of 2–4 carbon atoms in the alkyl group, preparing a copolymer of acrylonitrile and an alkyl acrylate or methacrylate comonomer of 1–3 carbon atoms in the alkyl group and then blending the grafted polybutadiene with the prepared copolymer in the appropriate concentrations.

The second procedure comprises interpolymerization of the acrylonitrile and comonomer in the presence of the grafted polybutadiene wherein formation of the resinous copolymer and the final molding composition proceed simultaneously.

GRAFTING OF POLYBUTADIENE

The major difficulty in regard to the above two procedures is in connection with the grafting of the polybutadiene rubber. Since the acrylonitrile is very difficultly solubilized in the rubber, grafting proceeds rather slowly, if at all, utilizing known techniques.

I have found that the grafting of the polybutadiene can be effected in one of two ways wherein from about 80 to about 20 percent, by weight, preferably from about 70 to about 60 percent, of acrylonitrile and from about 20 to about 80 percent, by weight, preferably from about 30 to about 40 percent, by weight, of the alkyl acrylate are contacted with the polybutadiene under stringent reaction conditions. Useful acrylates include ethyl acrylate, propyl acrylate, and n-, t- or iso-butyl acrylate.

One method of grafting the polybutadiene with the acrylonitrile and acrylate comprises preheating the monomers in the presence of the polybutadiene latex at a temperature ranging from about 50°C to about 100°C, preferably from about 60°C to about 80°C for from 30 minutes to about 8 hours, preferably from about one hour to about 4 hours. The rubber to monomer ratio should range from about 3 to 1 to about 1 to 2 in either grafting procedure.

After the preheating step, the grafting is conducted by the addition of a catalyst which will initiate such a procedure. Any known grafting catalyst system can be utilized for this purpose with the free-radical generating catalysts being preferred. The catalyst should be employed in amounts ranging from about 0.05 to about 1.0 percent, preferably from about 0.1 to about 0.75 percent, by weight, based on the total weight of the monomers employed. The grafting procedure is conducted at a temperature ranging from about 0°C to about 50°C, preferably from about 20°C to about 30°C for from about 30 minutes to about 24 hours.

Exemplary of the catalysts which may be utilized are the redox catalyst systems such as t-butyl hydroperoxide-ferrous chloride-sodium formaldehyde sulfoxolate; ferrous chloride-hydrogen peroxide; sodium chlorate-sodium sulfite; potassium persulfate-sodium metabisulfite; potassium persulfate-sodium thiosulfate; and the like.

It is preferable to cool the media which results from the preheating step to about room temperature before the addition of the catalyst thereto but such a procedure is not necessary if a catalyst which is rapidly acting at a temperature of the media is utilized.

Various emulsifiers such as sodium lauryl sulfate, potassium oleate, commercially available products such as mixtures of $R-O(CH_2\ CH_2\ O)_nPO_3M$ and $[R-O(CH_2\ CH_2\ O)_n]_2\ PO_2\ M$ wherein n is 1–40, R is an alkyl or alkaryl group and M is hydrogen, ammonia or an alkali metal and the like, may be utilized, if necessary, in order to reduce the coagulation which may form during the grafting process. Concentrations of emulsifiers below the critical micelle concentration should be employed.

The second procedure by which the acrylonitrile and alkyl acrylate monomer can be grafted onto the polybutadiene comprises slowly polymerizing the reaction madia at a high temperature. That is to say, the monomers are grafted onto the rubber at a temperature ranging from about 50°C to about 100°C, preferably from about 60°C to about 80°C, for from about 2 to about 10 hours, perferably from about 4 to about 8 hours.

The grafting is conducted in the presence of a catalysts which decomposes by thermal decomposition. Catalysts which conform to this definition are well known to those skilled in the art and include such systems as the peroxides (benzoyl peroxide), the persulfates (potassium persulfate), the peresters (t-butyl pivalate) and the like. Concentrations of catalysts within the range of from about 0.05 to about 1.0 percent, by weight, based on the weight of the monomer, may be employed.

COPOLYMERIZATION OF ACRYLONITRILE AND ACRYLIC MONOMER

In the copolymerization of the acrylonitrile and the alkyl acrylate or methacrylate monomer it is desirable to produce a uniform copolymer, i.e., one which contains a uniform amount of both materials throughout the polymerization. The process described hereinbelow enables the production of such copolymers under its optimum conditions.

The acrylonitrile, in concentrations ranging from about 80 to about 60 percent, by weight, is copolymerized with from about 20 to about 40 percent, by weight, of an alkyl acrylate or methacrylate wherein the alkyl group contains from 1–3 carbon atoms. The procedure which is employed in the copolymerization depends upon which acrylic comonomer is being copolymerized with the acrylonitrile. Examples of useful acrylic comonomers include methyl acrylate, ethyl acrylate, propyl acrylate, methyl methacrylate, ethyl methacrylate and propyl methacrylate.

When the acrylonitrile is copolymerized with the lower alkyl acrylates, bulk, solution, emulsion or suspension systems may be employed. Utilizing emulsion polymerization, which is the preferred system, the copolymerization is conducted at a temperature ranging from about 30°C to about 100°C, preferably from about 60°C to about 70°C, in the presence of a free-radical generating catalyst, examples of which are set forth hereinabove in applicable concentrations, for from about 1 to about 24 hours. It is preferred that the temperature at which the copolymerization is conducted is that which forms the same monomer concentration in the polymer as the monomer concentration charged to the reaction vessel. That is to say, if the monomer concentration comprises 90 percent of acrylonitrile and 10 percent of ethyl acrylate, it is preferred that a temperature of copolymerization is employed such that a copolymer containing 90 percent of acrylonitrile and 10 percent of ethyl acrylate is formed. In this regard, we have found that when ethyl acrylate is employed, the copolymerization temperature utilized should be about 60°C. When methyl acrylate is the comonomer, the polymerization temperature employed should be about 65°C. etc.

The copolymerization is preferably conducted in the presence of a chain transfer agent such as, for example, dodecyl mercaptan, n-ocytl mercaptan, t-dodecyl mercaptan, n-tetradecyl mercaptan, and the like and is employed in concentration ranging from about 0.1 to about 0.5 percent by weight, based on the weight of the monomers charged.

Emulsifiers which may be utilized are well known to those skilled in the art with such materials as those disclosed above being exemplary.

When solution polymerization is utilized to copolymerize the acrylonitrile and alkyl acrylate, the temperature employed should be within the range specified above for the emulsion polymerization with solvents such as acetonitrile, dimethyl formaldehyde, diethyl carbonate, dimethyl sulfoxide and the like, being employed. The copolymerization is again conducted in the presence of a chain transfer agent, as specified above, and in the presence of a free-radical generating catalyst such as azobisisobutyronitrile, benzoyl peroxide and the like. A contact time of from about 4–72 hours is satisfactory.

When a suspension polymerization is employed, conditions the same as those set forth hereinabove in regard to the emulsion system are followed except that no emulsifier is employed.

The molecular weight of the acrylonitrile-acrylate copolymer is not critical however, it has been found that copolymers having molecular weight ranging from about 70,000 to about 100,000, weight average, result in ultimate molding compositions having the best balance of physical properties and impact strength.

When the acrylonitrile is copolymerized with the lower alkyl methacrylates, a sequential addition of alkyl methacrylate must be employed, the overall system utilized being the emulsion polymerization system and all its conditions and features mentioned above. By sequential addition of alkyl methacrylates as utilized above and hereinafter, is meant that a certain alkyl methacrylate concentration which gives a certain concentration of that alkyl methacrylate in the resultant copolymer must be employed and maintained during the copolymerization procedure. That is to say, if for example, methyl methacrylate in a certain concentration gives a copolymer containing a certain concentration of methyl methacrylate therein, the methyl methacrylate must be sequentially added during the copolymerization in a degree such that the original methyl methacrylate concentration remains constant, thereby resulting in a constant copolymer. The concentration of the alkyl methacrylate which must be sequentially maintained can be determined by the reactivity ratio of the given monomer which is to be utilized. For example, again in regard to methyl methacrylate, a monomer concentration of about 95.5 percent of acrylonitrile and 4.5 of methyl methacrylate results in a copolymer containing about 75 percent of acrylonitrile and about 25 percent of methyl methacrylate when the polymerization is conducted at about 70°C. One skilled in the art can therefore readily determine what monomer concentration must be employed in regard to the other alkyl methacrylates useful herein without an excessive amount of experimentation.

BLENDING OF GRAFTED RUBBER WITH ACRYLONITRILE COPOLYMER

The grafted butadiene rubber and the acrylonitrile copolymer should be blended together such that the concentration of the grafted polybutadiene in the final composition ranges from about 5 to about 30 percent, by weight, based on the total weight of the composition. The two components may be blended with one another utilizing any procedure known in the art. If both components were produced by emulsion polymerization, the two emulsions may be merely physically admixed so as to produce an emulsion of the ultimate composition in the concentrations desired. Otherwise, if the copolymer was produced utilizing a solution system, the grafted rubber latex can be blended therewith in the appropriate concentrations and the volatile ingredients can be removed therefrom by devolatization and extrusion etc., as is known in the art.

If the acrylonitrile copolymer is produced in bulk, it can be blended with the grafted rubber after the grafted rubber has been dried, by admixing the dry solids on, for example, a two roll mill.

INTERPOLYMERIZATION OF ACRYLONITRILE AND ACRYLIC MONOMER IN THE PRESENCE OF GRAFTED POLYBUTADIENE

The second method by which the novel compositions of the instant invention can be prepared comprises the interpolymerization of the monomers to be utilized in the resin phase of the system in the presence of polybutadiene which has been previously pregrafted. In this regard, the grafted polybutadiene is prepared exactly as specified above in regard to the procedure wherein the components are first prepared and then physically admixed.

Once the grafted polybutadiene has been prepared, the acrylonitrile and alkyl acrylate or methacrylate monomers are then interpolymerized in the presence thereof. The conditions utilized for the interpolymerization are identical to those specified hereinabove in regard to the preparation of the resinous copolymer by emulsion polymerization. That is to say, when the lower alkyl acrylates are employed, the preferred temperature technique is followed and when the lower alkyl methacrylates are to be interpolymerized, the sequential addition technique is followed.

We have found that by the use of a pregrafted polybutadiene, higher impact strengths can be achieved in the ultimate molding compositions.

The following examples are set forth for purposes of illustration only and are not to be construed as limitations on the instant invention except as set forth in the appended claims. All parts and percentages are by weight unless otherwise specified.

EXAMPLE 1

PREPARATION OF GRAFTED POLYBUTADIENE

A. Redox Catalyst

Into a suitable round-bottom reaction vessel are placed 426 parts of polybutadiene latex (46 percent solids) and 960 parts of deionized water. 120 Parts of acrylonitrile, 80 parts of ethyl acrylate, rubber-monomer ratio 1:1, and 0.4 part of t-butyl hydroperoxide (inactive at reaction temperature without sulfoxylate and ferrous chloride) are added and the solution is heated to 60°C and maintained at that temperature for 1 hour. The solution is cooled to 23°C and 0.54 part of sodium formaldehyde sulfoxylate, 0.02 part of ethylenediamine tetraacetic acid and 0.004 part of ferrous chloride are added. The emulsion is then allowed to exotherm (reaches about 55°C) and cool to room temperature (about 90 minutes). Conversion is greater than 95 percent.

B. Free-Radical Catalyst

Into a suitable round bottom reaction vessel are placed 426 parts of polybutadiene latex (46 percent solids) and 960 parts of deionized water. 55 Parts of acrylonitrile, 23 parts of ethyl acrylate, rubber-monomer ratio 2.5:1, and 0.2 part of potassium persulfate are added. The solution is heated to 70°C and maintained for 5 hours. After cooling to 23°C, conversion is greater than 95 percent.

C. Ethyl Acrylate Substitutes

1. N-propyl acrylate and 2. n-butyl acrylate comonomers are substituted for the ethyl acrylate and the above procedures followed to prepare grafted polybutadiene in equivalent yields.

EXAMPLE 2

PREPARATION OF ACRYLONITRILE COPOLYMERS

A. Emulsion Polymerization

Into a suitable round bottom reaction vessel are placed 16 parts of a commercially available emulsifier, 1.0 part of potassium persulfate, 1.0 part of ethylenediamine tetraacetic acid and 1000 parts of deionized water. To the resultant mixture are added 350 parts of acrylonitrile, 150 parts of ethyl acrylate, 1.87 parts of n-octyl mercaptan and 1.87 parts of n-dodecyl mercaptan. The mixture is heated to 60°C while purging with nitrogen gas. The solution is maintained at 60°C for 5 hours after which time 95 percent conversion has occurred. The polymer is isolated by coagulation with aqueous aluminum sulfate solution, washed with water and dried in a vacuum oven at 60°C. The resultant copolymer has a melt index of 7.0 and a molecular weight of 84,000.

B. Solution Polymerization

A blend is prepared by mixing 455 parts of acrylonitrile, 195 parts of ethyl acrylate, 3.25 parts of n-dodecyl mercaptan, 2.6 parts of azobisisobutyronitrile and 350 parts of acetonitrile. The solution is poured into fortune tubes immersed in dry-ice and purged with nitrogen gas. The tubes are then sealed and immersed in an oil bath for 64 hours at 55°C to assure substantially complete conversion and isolated by freezing in dry ice. Conversion is found to be 97 percent. The copolymer is isolated by melting on a 2-roll mill for about 20–30 minutes at 350°F. The melt index is 2.7 and the molecular weight 93,000.

C. Ethyl Acrylate Substitutes

Copolymers of acrylonitrile with (1) methyl acrylate and acrylonitrile with (2) n-propyl acrylate are prepared in the same manner as the preparations of this Example, Parts A and B.

D. Acrylonitrile-Methacrylate Copolymers

Into a suitable reaction vessel are charged 380 parts of acrylonitrile, 20 parts of methyl methacrylate (95/5 wt. ratio), 5.6 parts of n-dodecyl mercaptan, 27 parts of the commercially available emulsifier specified above wherein n is 27, R is an ethyl group and M is sodium, and 1,500 parts of deionized water. The resultant solution is heated to 70°C and purged with nitrogen gas. Two solutions are then prepared; one contains 1.0 part of potassium persulfate, 1.0 part of ethylenediamine tetraacetic acid and 50 parts of water; the second solution contains 720 parts of acrylonitrile, 280 parts of methyl methacrylate and 14 parts of n-dodecyl mercaptan. The catalyst solution (No. 1) is added to the reaction vessel which begins the polymerization reaction and the monomers solution (No. 2) is incrementally pumped in as the polymerization proceeds over a 5 hour period at such a rate that the unreacted monomer in the vessel remains at the same level and in the same ratio of acrylonitrile to methyl methacrylate, i.e., 95/5. Maintenance of said 95/5 weight ratio results in the preparation of a copolymer containing about 72 percent acrylonitrile and 28 percent methyl methacrylate. After 5 hours, approximately 100 parts of polymer have formed and the reaction is stopped by rapid cooling to 23°C. The emulsion is then coagulated with aqueous aluminum sulfate solution. The polymer is washed with water and methanol and vacuum dried at 60°C for 72 hours. The melt index of the polymer is 5.0 and the molecular weight is 85,000. Elemental analysis of the polymer indicates a final composition of about 71/29 acrylonitrile/methyl methacrylate.

E. Methyl Methacrylate Substitutes

The procedure of Part D of this Example is again followed except that n-propyl methacrylate and ethyl methacrylate are individually substituted for the methyl methacrylate used therein. Similar results are attained.

EXAMPLE 3

ACRYLONITRILE COPOLYMER - GRAFTED RUBBER BLENDS

Some of the copolymers prepared above are blended in the specified concentrations with some of the grafted polybutadiene rubbers also prepared above by adding the components to a 2-roll rubber mill. The materials are fluxed and then blended at 350°F for about 5 minutes. The results are set forth in Table I, below.

Specimens for Gardner testing are prepared by compression molding samples into 6 inch square sheets of 30–32 mil thickness at temperatures of 330°–410°F and pressures of 1,000–2,000 p.s.i. About 16–20 drops are made using a 2 pound hammer in a standard Gardner Impact testing apparatus.

Into a suitable round bottom reaction vessel are placed 350 parts of (acrylonitrile/ethyl acrylate) grafted polybutadiene latex (1/1 rubber/monomer; 60/40 acrylonitrile/ethyl acrylate-redox prepared) of 25.0 percent solids. 333 parts of acrylonitrile, 112 parts of methyl acrylate, 3.6 parts of n-octyl mercaptan, 3.6 parts of n-dodecyl mercaptan, 13.0 parts of a commercially available emulsifier, (35 percent solids) 0.23 part of potassium persulfate, 0.23 part of ethylenediamine tetraacetic acid and 1,184 parts of deionized water are added and the mixture purged with nitrogen gas. The emulsion is heated to 65°C and maintained at 65°C for 6 hours after which time greater than 90 percent conversion is obtained. The polymer is isolated by coagulation in aqueous aluminum sulfate, washed with hot water and vacuum oven dried at 60°C.

The polymer has a melt index of 0.40 and a Gardner Impact of 2.10 in.lb./mil.

EXAMPLES 8–11

Following the procedure of Example 7, various other monomers are substituted for the methyl acrylate and the ethyl acrylate, where necessary, used therein. The monomers used are listed in Table III, below. Again compositions of higher impact strength than systems wherein the grafted acrylate has the same or a lower number of carbon atoms, in the alkyl group thereof than that of the acrylate or methacrylate of the acrylonitrile copolymer are produced.

TABLE I

| Copolymer of | Graft of | % Rubber | Gardner Impact In. 16/mil. |
|---|---|---|---|
| Ex. 2; Part C1 | Ex. 1; Part A | 10.0 | 2.2 |
| Ex. 2; Part C1 | Ex. 1; Part C2 | 10.0 | 2.0 |
| Ex. 2; Part D | Ex. 1; Part B | 10.0* | 1.70 |
| Ex. 2; Part C1 (Comparative Example) | Ex.1; Part A but methyl acrylate instead of ethyl acrylate | 10.0 | 1.0 |
| Ex. 2; Part D (Comparative Example) | Ex. 1; Part A but ethyl acrylate replaced by methyl methacrylate | 10.0 | 0.63 |

* This composition has a Heat Distortion Temperature at 264 p.s.i. of 76°C unannealed and 83°C annealed as injection molded ⅛inch × ½ inch flexural bars.

Examples 4–6

Again following the procedure of Example 3, blends are prepared from various copolymers and grafted polybutadienes as indicated in the examples above. In each instance, blends having superior impact strengths are attained. The specific blends are set forth in Table II, below.

TABLE II

| Grafted Polybutadiene of Example No. | Acrylonitrile Copolymer of Example No. |
|---|---|
| Example 1; Part C1 | Example 2; Part A |
| Example 1; Part C1 | Example 2; Part B |
| Example 1; Part C2 | Example 2; Part C2 |

Example 7

PREPARATION OF POLYMERS USING HIGHER ALKYL PREGRAFTED POLYBUTADIENE LATEX

TABLE III

| Ex. | Replacement for Methyl Acrylate | Replacement for Ethyl Acrylate |
|---|---|---|
| 8 | Methyl Methacrylate | n-propyl acrylate |
| 9 | Ethyl acrylate | n-butyl acrylate |
| 10 | n-propyl methacrylate | do. |
| 11 | n-propyl acrylate | do. |

I claim:

1. A composition comprising from about 5 to about 30 percent, by weight, of (1) polybutadiene rubber grafted with acrylonitrile and from about 20 to about 80 percent, by weight, of an alkyl acrylate, the alkyl group thereof having from 2–4 carbon atoms, inclusive, the rubber to monomer ratio ranging from about 3 to 1 to about 1 to 2, and from about 70 to about 95 percent, by weight, of (2) a copolymer of (A) from about 60 to about 80 percent, by weight, of acrylonitrile and (B) from about 20 to about 40 percent, by weight, of a lower alkyl acrylate or methacrylate, the alkyl group thereof having 1–3 carbon atoms, inclusive, the number of carbon atoms in the alkyl group of the grafted acrylate of (1) being more than the number of carbon atoms in the alkyl group of the copolymerized acrylate or methacrylate of (2).

2. A composition according to claim 1 wherein the grafted alkyl acrylate is ethyl acrylate.

3. A composition according to claim 1 wherein the grafted alkyl acrylate is n-butyl acrylate.

4. A composition according to claim 1 wherein said copolymerized lower alkyl acrylate is methyl acrylate.

5. A composition according to claim 1 wherein said copolymerized lower alkyl methacrylate is methyl methacrylate.

6. A composition according to claim 2 wherein said copolymerized lower alkyl acrylate is methyl acrylate.

7. A composition according to claim 2 wherein said copolymerized lower alkyl methacrylate is methyl methacrylate.

8. A composition according to claim 3 wherein said copolymerized lower alkyl acrylate is methyl acrylate.

9. A composition according to claim 3 wherein said copolymerized lower alkyl methacrylate is methyl methacrylate.

10. A composition comprising from about 5 to about 30 percent by weight of
I. A graft copolymer,
  A. the trunk of the graft copolymer 33–75 parts by weight of a polymer consisting of a homopolymer of 1,3-butadiene
  B. the monomer mixture grafted onto the trunk polymer consisting essentially of, 25–67 parts by weight of
    1. 20–80 percent by weight of acrylonitrile and respectively
    2. 20–80 percent by weight of an acrylic ester, the alkyl group thereof having from 2 to 4 carbon atoms inclusive
and from about 70 to about 95 percent by weight of
II. A copolymer of
  A. from about 60 to about 80 percent by weight of acrylonitrile and
  B. from about 20 to about 40 percent by weight of an alkyl acrylate or methacrylate, the alkyl group having from 1 to 3 carbon atoms inclusive,
the number of carbon atoms in the alkyl group of the grafted acrylate of I being more than the number of carbon atoms in the alkyl group of the copolymerized acrylate or methacrylate of II.

* * * * *